United States Patent Office 3,644,317
Patented Feb. 22, 1972

3,644,317
PROCESS FOR THE POLYMERIZATION OF VINYL CHLORIDE
Sergio Lo Monaco, Corrado Mazzolini, Luigi Patron, and Alberto Moretti, Venice, Italy, assignors to Chatillon Società Anonima Italiana per le Fibre Tessili Artificiali S.p.A., Milan, Italy
No Drawing. Filed Dec. 12, 1968, Ser. No. 783,413
Claims priority, application Italy, Dec. 15, 1967, 23,916/67
Int. Cl. C08f 3/30, 1/62, 1/80
U.S. Cl. 260—85.5   9 Claims

ABSTRACT OF THE DISCLOSURE

In the low-temperature polymerization of vinyl chloride alone, or in admixture with small quantities of other copolymerizable monomers, by using as a catalyst a catalytic system comprising an organic hydroperoxide, sulphur dioxide and a compound selected from the group consisting of alcohols, alcoholates, their derivatives and their mixtures, it is possible (according to the present invention) to stop the polymerization at the desired degree of conversion and to avoid post-polymerization in the reaction mixture as well as during the recovery of the monomers, by treating the reaction mixture with a water-soluble hydroxylamine salt such as the hydrochloride, sulphate, oxalate, phosphate or acetate.

---

The present invention relates to an improved process for the low temperature polymerization of vinyl chloride alone or in admixture with minor quantities of other copolymerizable monomers.

More particularly, this invention relates to an improved process for the low temperature polymerization of vinyl chloride alone or in admixture with minor quantities of one or more copolymerizable monomers, by using as a catalyst a catalytic system consisting of an organic hydroperoxide, sulphur dioxide and a compound selected from the group consisting of alcohols, alcoholates, their derivatives and their mixtures, wherein the polymerization may be stopped at a certain predetermined degree of polymerization and wherein the subsequent separation and recovery operations of the components of the reaction mixtures may be carried out at temperatures considerably higher than the polymerization temperature, without post-polymerization setting in.

By low temperature polymerization is meant a polymerization conducted at a temperature below 0° C.

It is known that by polymerizing vinyl chloride at a low temperature, that is, at a temperature below 0° C., a polymer is obtained having chemical-physical characteristics considerably superior to those of the corresponding polymers obtained by polymerization at room temperatures or even higher temperatures. These improvements, which are to be attributed mainly to a greater degree of crystallinity in the polymer, make such a polymer particularly suited for use in the production of fibers, films, sheets and other similar formed bodies.

It is also known that for carrying out low-temperature polymerizations it is necessary to operate in the presence of particular catalysts active at such a low temperature. For this purpose it has recently been suggested to use as a catalyst a catalytic system consisting of an organic hydroperoxide, sulphur dioxide and a compound selected from the group consisting of alcohols, alcoholates, their derivatives and their mixtures.

By "organic hydroperoxide" are meant all the organic compounds of the general formula: R—O—O—H, wherein R may be a linear or branched chain alkyl radical, a cycloalkyl radical, an aryl radical or an arylalkyl radical. Amongst the compounds having this general formula, the preferred ones are: cumene hydroperoxide and tertiary-butyl-hydroperoxide. The preferred quantity of such organic hydroperoxides lies between 0.01% and 3% by weight with respect to the monomer or mixture of monomers.

It is also known that in order to obtain a homogeneous polymer, and therefore one more suited to be transformed into fibers, films etc., not only it is important to maintain the polymerization temperature practically constant throughout the polymerization, but that it is also necessary to avoid post-polymerization taking place in the subsequent operations to which the polymer will be subjected.

Such post-polymerization is due to the presence, in the reaction mixture or in the polymer itself, of unreacted monomers and of still active catalyst or of the catalyst that may be activated by raising the temperature during the separation stages of the polymer following the polymerization.

As is known, this post-polymerization alters considerably the chemical-physical properties of the polymer, such as for instance the color and the thermal stability, and also considerably reduces the degree of syndiotacticity of the polymer.

In order to obviate this serious drawback it has been suggested, according to the known technique, to carry out the phases following the polymerization, that is, the separation and recovery of the components of the reaction mixture, at very low temperatures, considerably lower than the polymerization temperatures. For instance, according to one of the known processes, the reaction mass after polymerization was first cooled down to a temperature of about 20° lower than the polymerization temperature whereupon it was then subjected to centrifugation at low temperature. The monomer that separates, after further cooling down in order to hinder or to reduce to a minimum the further formation of polymer, is then recycled back into the polymerization reactor, while the polymer, with still a residual part of absorbed monomer, is further purified by cold-washing with a solvent for the monomer and for the catalyst.

The polymer may also be separated from the monomer by evaporating the monomer through heating with hot water (for instance at 60° C.) in the presence of oxygen which inhibits the activity of any catalyst still present in the mixture.

In practice, however, by purifying the polymer by washing it with a solvent for the monomer, there subsequently arises the problem of the recovery of the monomer from its solution, which actually requires the aid of a set of costly apparatuses and a series of complex technologies. On the other hand, by separating the polymer by evaporation of the monomer in the presence of oxygen, vinyl chloride is obtained which contains dissolved in it oxygen which is a handicap for its further use, as the oxygen interferes with the activity of the polymerization catalyst.

Furthermore, the chemical-physical properties of the polymer obtained, and particularly its color are not at all satisfactory, especially in case the polymer is to be used for preparing fibers.

It has also been suggested, according to the known technique, to stop the polymerization at a predetermined degree by the addition of suitable substances capable of inhibiting the activity of the catalytic system, such as for instance hydroquinone, sodium sulphite, ferrous sulphate, etc. In the case, however, in which the polymerization temperature is less than 0° C., as happens in the polymerization of the vinyl chloride when a catalytic system is used which comprises an organic hydroperoxide, sulphur dioxide and a compound selected from the group consisting of alcohols, alcoholates, their derivatives and their mixtures, such stopping agents are not capable of blocking the polymerization. Furthermore, these substances have the very serious drawback of introducing residues into the polymer which lead to the unwanted phenomena of the coloration and loss of thermal stability. Such alterations of the chemical-physical properties of the polymer are wholly inadmissible where the product is to be used for the production of fibers, films, etc.

According to the present invention, it has been surprisingly found that in the low-temperature polymerization of vinyl chloride alone or in admixture with small quantities of other copolymerizable monomers, by using as the catalyst a catalytic system comprising an organic hydroperoxide, sulphur dioxide and a compound selected from the group consisting of alcohols, alcoholates, their derivatives and their mixtures, it is possible to stop the polymerization at the desired degree of conversion and to avoid post-polymerization in the reaction mixture as well as during the recovery of the monomers, by treating such a reaction mixture with a hydroxylamine salt. The hydroxylamine salt may be selected from a wide range of such compounds, such as for instance: hydrochloride, sulphate, oxalate, phosphate, acetate, etc.

As a matter of fact, it has been surprisingly observed that the reaction mass obtained after the treatment with a hydroxylamine salt, according to the process of the invention, may be subjected to all the subsequent phases of separation and recoverey of the various components, that is of the polymers and monomers, at room temperature or even at higher temperatures without post-polymerization setting in.

Furthermore, the chemical-physical properties of the polymer thus obtained, and particularly the molecular weight, the syndiotacticity index and the color, are such as to allow an advantageous use of this polymer in the preparation of synthetic fibers and the like.

Practically, however, particularly satisfactory results are achieved by using hydroxylamine hydrochloride or hydroxylamine sulphate.

The quantity of hydroxylamine salt to be used in the process depends on the quantity of organic hydroperoxide used in the polymerization. The best results are obtained when the molar ratio hydroxylamine salt/organic hydroperoxide lies between 0.5:1 and 3:1. Of course, greater quantities of the hydroxylamine salt can be used, but this does not involve any further advantages for the process but only an unnecessary waste of a relatively costly material and, thus, an increase in the cost of the process with no attendant advantages.

According to the process of the present invention, and in the case of discontinuous polymerization, the addition of the hydroxylamine salt may be carried out directly in the polymerization vessel or in another subsequent vessel into which the reaction mixture is transferred and maintained at a temperature near that of the polymerization. In case, however, that a continuous polymerization is used, the hydroxylamine salt may be added at any desired point after the polymerization vessel, for instance in the overflow pipe, in the container-vessel before the monomer/polymer separation or in any other vessel into which the reaction mass is transferred and in which the separation and the recovery of the components of the reaction mixture are carried out.

The desired hydroxylamine salts may be added either as such or, better still, in solution in suitable solvents. In general, amongst the various solvents that may be used, it is preferred for practical reasons to use water or an aliphatic alcohol having from 1 to 4 carbon atoms, and preferably methyl or ethyl alcohol. For practical reasons an organic solvent solution is used, but a lower alcohol solution of the hydroxylamine salt is preferred when the addition of such a salt is made in the polymerization vessel or into the overflow pipe or into the container vessel in which the polymer is dispersed in the monomer.

If the addition of such a hydroxylamine salt is made in the vessel in which the separation monomer and polymer is carried out by evaporation with heated water, an aqueous solution of the hydroxylamine salt can be successfully used. In such a case, however, and particularly when a salt of hydroxylamine with a strong acid is used, such as for instance the sulphate or hydrochloride, it will be preferable to keep the pH value around 5–7 by sodium carbonate or sodium bicarbonate, in order to improve the efficiency of the inhibitor.

According to the present invention the soluble salts of hydroxylamine, and particularly those cited above, are used in order to stop the polymerization at the desired degree of conversion and to avoid post-polymerization in the low-temperature polymerization in bulk, in solution or in suspension, of the vinyl chloride alone or in admixture with other ethylenically unsaturated copolymerizable monomers, in which at least 80% of the mixture consists of vinyl chloride, and wherein use is made of a catalytic system comprising an organic hydroperoxide, sulphur dioxide and a compound selected from the class consisting of alcohols, alcoholates, their derivatives and their mixtures.

By the term "ethylenically unsaturated copolymerizable monomers" are meant compounds containing the C=C group.

For exemplification purposes there may be cited vinylidenic or vinylic compounds such as vinylidene chloride, vinylidene fluoride and vinyl fluoride, vinyl esters of aliphatic carboxylic acids containing from 2 to 18 carbon atoms, such as for instance the vinyl esters of acetic acid, of propionic acid, etc., acrylic compounds such as acrylonitrile, methacrylonitrile, acrylic or methacrylic acid or their derivatives, acrylates or methacrylates of aliphatic alcohols containing from 1 to 12 carbon atoms, etc.

The use of the salts of hydroxylamine cited above for short-stopping the low-temperature polymerization of vinyl chloride, in which use is made, as catalysts, of a catalytic system consisting of organic hydroperoxide, sulphur dioxide and a compound selected from the class consisting of alcohols, alcoholates, their derivatives and their mixtures, has proved to be advantageous also in the case in which the above-mentioned polymerization is conducted in the presence of "fluidizing" agents such as: saturated aliphatic hydrocarbons, aryl hydrocarbons, cycloalkyl hydrocarbons, saturated halogenated hydrocarbons, mercaptans having from 1 to 15 carbon atoms, etc. These latter, and especially those with the number of carbon atoms lying between 4 and 8 inclusive, has in practice proved to be particularly effective.

According to a preferred and non-limiting process of the present invention, into a polymerization reactor, kept at a temperature of −30° C., are continuously and separately fed in vinyl chloride, cumene hydroperoxide, sulphur dioxide and an alcohol or a magnesium alcoholate in an alcoholic solution.

Through the overflow pipe the reaction mixture is continuously discharged into a container vessel kept at −30° C., into which is fed an alcoholic solution of hydroxylamine sulphate. The suspension of the polymer, thus short-stopped, is then transferred into an evaporator containing water at 50° C. and in which the pH value is kept at between 5 and 7 by adding sodium bicarbonate.

From this evaporator the monomer is then recovered by evaporation and the polymer is separated by centrifugation, after which it is washed and dried.

When the monomeric material thus recovered by evaporation or the aqueous suspension of the polymer before centrifugation is left at room temperature or at higher temperature, no polymerization can be detected.

Furthermore, the polymer thus obtained shows a high degree of crystallinity, a homogeneous molecular weight as well as being very white and showing an excellent heat stability. Because of all these properties the polymer is particularly suited for being transformed into fibers, films, etc. of excellent physical and chemical characteristics.

The following examples are given merely for better illustrating the basic inventive idea of this invention.

EXAMPLE 1

In order to stress the capacity shown by a hydroxylamine salt for stopping the low-temperature polymerization of vinyl chloride in which there is used, as a catalyst, a catalytic system consisting of cumene hydroperoxide, sulphur dioxide, and a compound selected from the class consisting of alcohols, alcoholates, their derivatives and their mixtures, the following test was carried out:

Into a 2 liters glass polymerization reactor provided with a stirrer, a refrigerating system and a thermometer and containing 1000 g. of vinyl chloride and 0.1 g. of n-butyl-mercaptan as a fluidizer, maintained at a temperature of −30° C., there were added 2.58 g. of cumene hydroperoxide, 5.37 g. of $SO_2$ and 2.5 g. of magnesium methylate dissolved in 30 cc. of methyl alcohol. The polymerization starts at once and the polymer thus forming precipitates progressively.

After 2 hours the polymerization conversion attains 8.4% (expressed as percent of vinyl chloride transformed into polyvinyl chloride).

If the same example is repeated, however, in the presence of 2.8 g. of hydrochloride of hydroxylamine, after 2 hours no formation of polymer can be observed.

evaporation while the polymer is separated by centrifuging and then washed and dried.

(b) Into the overflow pipe, from which is discharged the polymer suspension, is fed a methanolic solution at 10% by weight of hydroxylamine hydrochloride in such a quantity as to obtain a molar ratio hydroxylamine hydrochloride/hydroperoxide feed equalling 0.5. The monomer and the polymer are recovered in the same way as in (a).

(c) Into the overflow pipe, from which is discharged the polymer suspension, is fed a methanolic solution at 10% by weight of hydroxylamine hydrochloride in such a quantity as to obtain a molar ratio, hydroxylamine hydrochloride/hydroperoxide feed of 1. The monomer and the polymer are recovered as in (a).

(d) Into the overflow pipe, from which is discharged the polymer suspension, is fed a methanolic solution at 10% of hydroxylamine hydrochloride in such a quantity as to obtain a molar ratio hydroxylamine hydrochloride/hydroperoxide feed equal to 3. The monomer and polymer are recovered as in (a).

(e) From an overflow pipe the polymer suspension is continuously discharged into a vessel containing water at about 40° C., at the same time feeding both an aqueous solution at 20% of hydroxylamine hydrochloride in such a quantity as to have a molar ratio of hydroxylamine hydrochloride/hydroperoxide feed equal to 2, as well as a solution at 5% of sodium bicarbonate so as to maintain the pH value of the suspension between 6 and 7. The monomer and the polymer are recovered in the same way as in (a).

TABLE I

| Polymer | Molar ratio hydroxylamine salt/hydroperoxide | Conversion in percent | Intrinsic[1] viscosity | Syndiotactic[2] index | Original color[3] | | Thermal sensitivity[4] | |
|---|---|---|---|---|---|---|---|---|
| | | | | | IP | ΔB | IP | ΔB |
| a | | 12.3 | 1.16 | 1.9 | 98.3 | 89.5 | 5.6 | 23.8 |
| b | 0.5 | 10.2 | 1.19 | 2.0 | 98.9 | 90.0 | 5.1 | 19.6 |
| c | 1 | 10.5 | 1.2 | 1.2 | 99.2 | 91.3 | 3.3 | 14.2 |
| d | 3 | 10 | 1.25 | 2.15 | 99.9 | 93.4 | 2.9 | 13.7 |
| e | 2 | 10.2 | 1.24 | 2.20 | 99.8 | 93.5 | 2.8 | 13.9 |

[1] The intrinsic viscosity is expressed in dl./g. and is measured from a 0.1% solution in cyclohexanone at 30° C.
[2] The syndiotacticity index is established on the basis of the ratio between the absorption coefficients of the infrared bands D 635 cm.$^{-1}$ and D 693 cm.$^{-1}$, as described by Fordham, Burleigh and Sturn, in J. Polymer Sci., vol. XLI, pages 73–82 (1959).
[3] The original color is measured by means of a General Electric Integrating Spectrophotometer according to the C.I.E. system of representation and measurment of colors. According to this system the color is expressed in terms of the purity index (IP) and brightness (B).
[4] The thermal sensitivity is given by the variation of the purity index (ΔIP) and by the variation of the brightness (ΔB) of the polymer after heating for one hour at 110° C. in a forced hot-air oven.

The same results are obtained upon replacing the hydroxylamine hydrochloride by hydroxylamine sulphate or acetate.

EXAMPLE 2

Into a 2 liters glass polymerization reactor provided with a stirrer, a refrigerating system, a thermometer and burets for feeding the reactants, there are continuously fed in:

| | G./hr. |
|---|---|
| Vinyl chloride | 500 |
| n-Octyl-mercaptan, as fluidizer | 0.15 |
| Cumene hydroperoxide | 0.725 |
| Sulphur dioxide | 0.765 |
| Magnesium methylate in 5 cc. of methyl alcohol | 0.515 |

The temperature in the reactor is maintained strictly at −30° C. by a thermostatic bath.

In the following Table I the properties of the polymer thus obtained are recorded for each of the noted variations:

(a) From an overflow pipe the suspension of the polymer obtained is continuously discharged into water maintained at a temperature of about 40° C. and at a pH of 6–7 by sodium bicarbonate. The monomer is recovered by

What is claimed is:

1. In a process for the low temperature polymerization of vinyl chloride alone or in admixture with up to 20% of other copolymerizable monomers at a temperature below 0° C., and in which a catalytic system is employed comprising an organic hydroperoxide, sulphur dioxide and at least one compound selected from the class consisting of alcohols, alcoholates, their derivatives and their mixtures, the improvement comprising stopping the polymerization at the desired moment by treating the reaction mixture with a salt of hydroxylamine.

2. A process according to claim 1, wherein said hydroxylamine salt is dissolved in water or in an aliphatic alcohol having from 1 to 4 carbon atoms.

3. A process according to claim 1, wherein said hydroxylamine salt is the hydrochloride, sulphate, oxalate, phosphate, or acetate.

4. A process according to claim 3, wherein said hydroxylamine salt is the hydrochloride.

5. A process according to claim 3, wherein said hydroxylamine salt is the sulphate.

6. A process according to claim 1, wherein the molar ratio hydroxylamine salt/organic hydroperoxide feed lies between 0.5:1 and 3:1.

7. A process according to claim 1, wherein the polymerization is conducted in the presence of a mercaptan having from 1 to 15 carbon atoms, as fluidizing agent.

8. A process according to claim 7, wherein the polymerization is conducted in the presence of a mercaptan having from 4 to 8 carbon atoms, as fluidizing agent.

9. In a process for the low temperature polymerization of vinyl chloride alone or in admixture with up to 20% of other copolymerizable monomers at a temperature below 0° C. in which a catalytic system is employed comprising an organic hydroperoxide, sulphur dioxide and at least one compound selected from the class consisting of alcohols, alcoholates, their derivatives and their mixtures, wherein the concentration of the organic hydroperoxide is between 0.01% and 3% by weight with respect to the total weight of the monomer, the improvement comprising stopping the polymerization at the desired moment by treating the reaction mixture with a salt of hydroxylamine in an amount corresponding to a molar ratio of hydroxylamine salt/organic hydroperoxide of at least 0.5:1.

References Cited

UNITED STATES PATENTS

| | | | |
|---|---|---|---|
| 3,255,164 | 3/1966 | Visger et al. | 260—86.3 |
| 3,294,770 | 12/1966 | Ragazzini et al. | 260—92.8 |
| 3,415,797 | 12/1968 | Borsini et al. | 260—92.8 |
| 3,372,219 | 3/1968 | Gord et al. | 260—92.8 |

JOSEPH L. SCHOFER, Primary Examiner

J. A. DONAHUE, JR., Assistant Examiner

U.S. Cl. X.R.

260—86.3, 87.1, 87.5 A, 87.7, 92.8 A